G. K. HURLBUT & C. C. WILLIAMS.
ADJUSTABLE BASE FOR CUTS.
APPLICATION FILED JAN. 30, 1908.
917,947.
Patented Apr. 13, 1909.
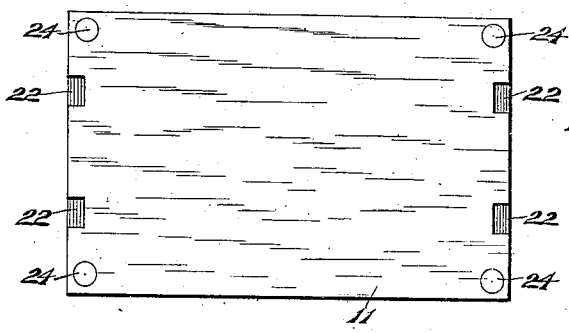
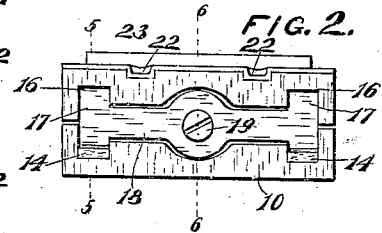
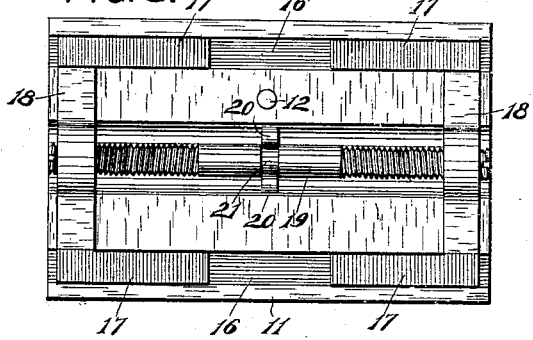
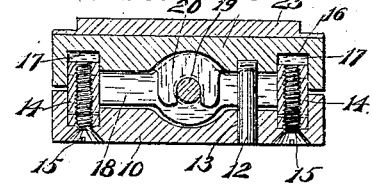
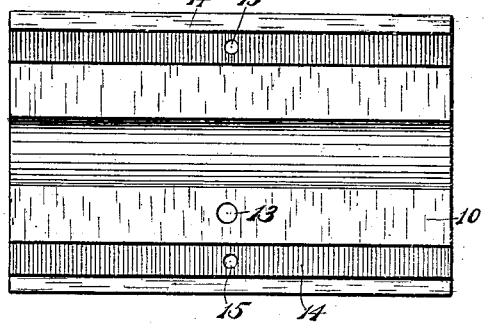
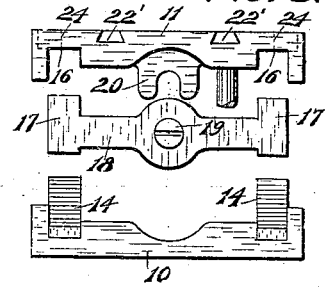
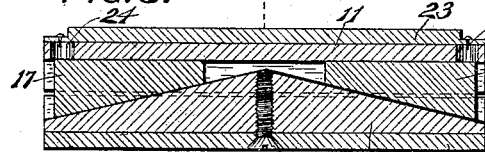
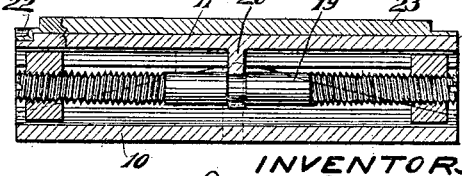
WITNESSES.
INVENTORS.
George K. Hurlbut & Charles C. Williams.
By Benedict, Morsell & Caldwell
ATTORNEYS.

UNITED STATES PATENT OFFICE.

GEORGE K. HURLBUT AND CHARLES C. WILLIAMS, OF MILWAUKEE, WISCONSIN.

ADJUSTABLE BASE FOR CUTS.

No. 917,947.   Specification of Letters Patent.   Patented April 13, 1909.

Application filed January 30, 1908. Serial No. 413,369.

*To all whom it may concern:*

Be it known that we, GEORGE K. HURLBUT and CHARLES C. WILLIAMS, residing in Milwaukee, in the county of Milwaukee and State of Wisconsin, have invented new and useful Improvements in Adjustable Bases for Cuts; of which the following is a description, reference being had to the accompanying drawings, which are a part of this specification.

This invention has for its object to provide an adjustable base for cuts for printing purposes which is to take the place of the usual wooden or other base and is capable of expansion and contraction to obviate the necessity for trimming the base to bring the face of the cut exactly type high.

An electro-type or other printing cut is usually in the form of a thin sheet of metal with the figure to be printed standing in relief thereon, and as the printing surface is required to stand at exactly the height of the type with which it is used in order that a clear impression may be made, a base is necessary as a support therefor. All cuts are not of the same thickness and consequently the height of the base is required to be adjusted in each particular case to suit the thickness of the cut. It is very desirable to have a base which may be mechanically expanded or contracted in height, so as to be adjustable to meet the requirements of all cases, and such is the object of the present invention.

This invention comprises a base formed by a pair of members adjustable with relation to each other so as to be capable of moving nearer together or farther apart, and one particular embodiment of the invention clearly illustrating its principles is herein shown and described. As a means for adjusting the members, this construction has a pair of wedge shaped cams located between them and bearing thereon, being adjustable toward or away from each other by threading on a right and left hand adjusting screw so as to force the members farther apart or permit them to move closer together.

With the above and other objects in view the invention consists in the adjustable base for cuts as herein claimed, its parts and combinations of parts and all equivalents.

Referring to the accompanying drawings in which like characters of reference indicate the same parts in the several views; Figure 1 is a plan view of an adjustable base for cuts constituting one embodiment of this invention; Fig. 2 is an end elevation thereof; Fig. 3 is a plan view of the upper member inverted and removed from the lower member; Fig. 4 is a plan view of the lower member with the upper member removed; Fig. 5 is a longitudinal sectional view thereof on the plane of line 5—5 of Fig. 2; Fig. 6 is a similar view on the plane of line 6—6 of Fig. 2; Fig. 7 is a central transverse sectional view thereof; and, Fig. 8 is an end elevation of the several parts disconnected and showing a modification of the form of notch in the upper member for receiving correspondingly shaped projections on the cut used therewith.

In these drawings 10 represents a lower member and 11 an upper member which are preferably of metal and of the same shape and size and are movable with relation to each other, a guide pin 12 being threaded in the upper member and slidably fitting in an opening 13 in the lower member to guide them in their movements and to retain the upper member in position directly above the lower member. The lower member has a pair of fixed cams 14 let into and partly filling parallel grooves near its edges and securely held in place by screws 15, while the upper member is likewise provided with corresponding parallel grooves 16 near its edges in which wedge shaped cams 17 travel said cams 17 extending into the unoccupied portions of the grooves of the lower member. The two cams 17 at each end of the device are connected together by a yoke 18 and the two yokes are threaded on the opposite ends of an adjusting screw 19, which has right and left hand threads for this purpose, so that the yokes with their cams 17 are moved in opposite directions when the adjusting screw is turned. To provide a way for the enlarged central portions of the yokes 18, where they form nuts threaded on the ends of the adjusting screw, the upper and lower members are centrally grooved as shown in the drawings. A forked arm 20 is mounted on the upper member and engages the shoulders formed by a reduced portion 21 of the adjusting screw to prevent longitudinal movement of the adjusting screw.

The upper member 11 is provided with notches or recesses 22 at its ends into which the reduced edges of the cut may be forced, as shown in Figs. 2 and 6, to prevent the displacement of the cut on the base. Notches 22' are shown in Fig. 8, differing from the notches 22 by being of a dove-tail shape, so that when the edge of the cut is forced therein it may engage the shoulders formed by the contracting ends of the notches and thereby be prevented from accidental removal. This top member is also provided with wooden plugs 24 fitting in openings near its corners to receive tacks and the like used for fastening the cuts thereto.

In operation the cut is placed upon the top of the upper section 11 and is secured in place by forcing its thin edges into the recesses 22 or 22', as the case may be, and in some cases by driving tacks through its edge into the wooden plugs 24, and then the adjusting screw 19 is turned, preferably by means of a screw driver fitting in a slot provided in its end, so as to cause the two yoke members 18 to move nearer together or farther apart and thereby force the wedge cams 17 along the inclined surfaces of the cams 14 to raise the upper member or to permit it to move toward the lower member, according to the direction in which the screw is turned. This adjusting operation is continued until the face of the cut stands in a plane exactly the distance from the bottom of the lower member 10 as the distance between the ends of the type. It is obvious that this adjustment may be accomplished very quickly by placing the adjustable base containing the cut in a suitable gage which has an opening the right size, and then turning the adjusting screw until the parts are expanded to meet the walls of the gage.

With this invention there is no necessity for carefully fitting bases for each cut by building up or shaving off as usual, as by merely turning the adjusting screw the height of the cut may be varied at will, and as the cams at both ends of the base have the same inclination and the pitch of the screw threads at both ends of the adjusting screw is the same the top and bottom surfaces of the base will remain in parallel planes in all adjustments.

The adjustable base may of course be used repeatedly with different cuts, and being made of metal is practically indestructible, the wooden plugs 24, which are the only parts not made of metal, being easily replaced when worn.

While the saving in materials by the use of the present invention is an important item, the saving of time resulting from its use is of utmost value, especially in newspaper work where time is such a vital factor.

What we claim as our invention and desire to secure by Letters Patent is:

1. An adjustable base for cuts, comprising a pair of members having corresponding grooves near their edges, fixed cams secured in the grooves of one member, movable cams slidably mounted in the grooves of the other member and bearing on the fixed cams, yokes connecting the movable cams at each end of the base, a screw having right and left hand threads on which the yokes are mounted, and means for preventing longitudinal movement of the screw.

2. An adjustable base for cuts and the like, comprising a pair of members having corresponding grooves near their edges, fixed cams mounted in the grooves of one member, movable cams slidable in the grooves of the other member and bearing on the fixed cams, yokes connecting the movable cams at each end of the base, a screw having right and left hand threads on which the yokes are mounted, there being shoulders on the screw, and a forked arm on one member engaging the shoulders of the screw to prevent longitudinal movement thereof.

3. An adjustable base for cuts and the like, comprising a pair of members having corresponding grooves near their edges, fixed cams secured in the grooves of one member and partially occupying the same, movable cams slidable in the grooves of the other member and extending into the unoccupied portion of the grooves of the first mentioned member, yokes connecting the movable cams at each end of the base, a screw on which the yokes are mounted, and a pin on one member fitting into a corresponding opening in the other member.

4. An adjustable base for cuts and the like, comprising a pair of members having corresponding grooves, fixed cams secured in the grooves of one member and partially filling the same, movable cams slidable in the grooves of the other member and extending into the grooves of the first mentioned member, yokes connecting the movable cams, and a screw on which the yokes are mounted.

In testimony whereof, we affix our signatures, in presence of two witnesses.

GEORGE K. HURLBUT.
CHARLES C. WILLIAMS.

Witnesses:
R. S. C. CALDWELL,
ANNA F. SCHMIDTBAUER.